(12) United States Patent
Tseng

(10) Patent No.: US 9,197,321 B2
(45) Date of Patent: Nov. 24, 2015

(54) OPTICAL COMMUNICATION APPARATUS

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 16 days.

(21) Appl. No.: 14/160,570

(22) Filed: Jan. 22, 2014

(65) Prior Publication Data

US 2014/0314404 A1 Oct. 23, 2014

(30) Foreign Application Priority Data

Apr. 18, 2013 (TW) .............................. 102113773 A

(51) Int. Cl.
*H04B 10/079* (2013.01)
*H04B 10/114* (2013.01)

(52) U.S. Cl.
CPC ........ *H04B 10/0795* (2013.01); *H04B 10/1141* (2013.01)

(58) Field of Classification Search
CPC .................................................. H04B 10/1141
See application file for complete search history.

(56) References Cited

U.S. PATENT DOCUMENTS

| | | | | |
|---|---|---|---|---|
| 6,509,992 B1 * | 1/2003 | Goodwill | ....................... | 398/131 |
| 6,775,480 B1 * | 8/2004 | Goodwill | ....................... | 398/158 |
| 7,155,129 B2 * | 12/2006 | Bringans et al. | .............. | 398/131 |
| 8,611,758 B2 * | 12/2013 | Kuo et al. | ..................... | 398/164 |
| 2003/0202796 A1 * | 10/2003 | Nagai et al. | ................... | 398/151 |

* cited by examiner

*Primary Examiner* — Nathan Curs
(74) *Attorney, Agent, or Firm* — Novak Druce Connolly Bove + Quigg LLP

(57) ABSTRACT

An optical communication apparatus includes an emitting device and a receiving device. The emitting device includes optical signal emitters, a first driver chip, a first lens member, a first control chip, and a first wireless transmitting and receiving unit. The receiving device includes optical signal receivers, a second driver chip, a second lens member, a second control chip, and a second wireless transmitting and receiving unit. The optical signal emitter emits light carrying optical signals. The first wireless transmitting and receiving unit wirelessly transmits intensity information of the light to the receiving device. The second wireless transmitting and receiving unit receives the intensity information. The second driver chip drives the optical signal receivers to receive the light. The second control chip calculates an intensity of the received light, compares the calculated intensity to the intensity information, and determines whether a transmitting efficiency of the optical communication apparatus is satisfied.

10 Claims, 1 Drawing Sheet

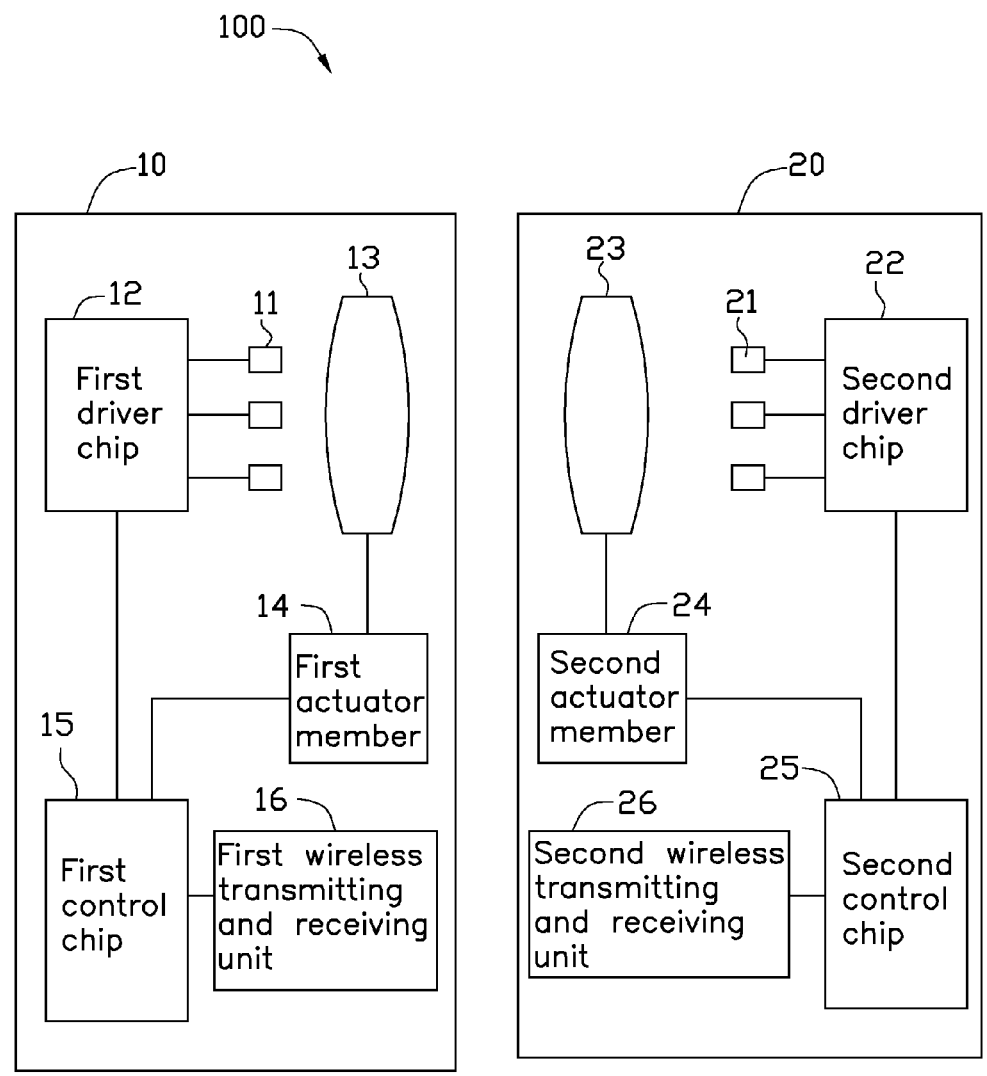

OPTICAL COMMUNICATION APPARATUS

BACKGROUND

1. Technical Field

The present disclosure relates to communication apparatuses, and particularly to an optical communication apparatus.

2. Description of Related Art

An optical communication apparatus generally includes an emitting device, a receiving device, and a light waveguide positioned between the emitting device and the receiving device. The emitting device includes a number of optical signal emitters for emitting light carrying optical signals. The receiving device includes a number of optical signal receivers corresponding to the optical signal emitters, for respectively receiving light emitted by the optical signal emitters. In assembly, the optical signal emitters and the optical signal receivers should be optically aligned with the light waveguide to ensure a transmitting efficiency of the optical communication apparatus. However, at present, the transmitting efficiency of the optical communication apparatus only can be measured upon assembly of the optical communication apparatus. As such, if the transmitting efficiency is less than required, the optical communication apparatus needs to be disassembled, repaired, and then reassembled, which is inefficient.

Therefore, what is needed is an optical communication apparatus addressing the limitations described.

BRIEF DESCRIPTION OF THE DRAWING

The components of the drawing are not necessarily drawn to scale, the emphasis instead being placed upon clearly illustrating the principles of the embodiments of the present disclosure.

The FIGURE is a schematic view of an optical communication apparatus, according to an exemplary embodiment of the present disclosure.

DETAILED DESCRIPTION

The FIGURE shows an optical communication apparatus 100, according to an exemplary embodiment of the present disclosure. The optical communication apparatus 100 includes an emitting device 10 and a receiving device 20.

The emitting device 10 includes a number of optical signal emitters 11, a first driver chip 12, a first lens member 13, a first actuator member 14, a first control chip 15, and a first wireless transmitting and receiving unit 16. The first driver chip 12 is electrically connected to the optical signal emitters 11, the first actuator member 14 is connected to the first lens member 13, the first control chip 15 is electrically connected to the first actuator 14 and the first driver chip 12, and the first wireless transmitting and receiving unit 16 is electrically connected to the first control chip 15.

The optical signal emitters 11 convert electrical signal into corresponding optical signals and emit light carrying the optical signals. The optical signal emitters 11 are arranged in a predetermined manner, in this embodiment, the optical signal emitters 11 are arranged along a direction substantially perpendicular to an optical axis of the first lens member 13, and a light emitting direction of each optical signal emitter 11 is substantially parallel to the optical axis of the first lens member 13. The optical signal emitters 11 are laser diodes.

The first driver chip 12 drives the optical signal emitters 11 to generate and emit optical signals.

The first lens member 13 converges light emitted by the optical signal emitters 11. In this embodiment, the first lens member 13 is a telecentric lens.

The first actuator member 14 drives the first lens member 13 and thereby adjusts a position of the first lens member 13. In one embodiment, the first actuator member 14 is at least a two dimensional actuator, for driving the first lens member 13 to move along a first direction substantially parallel to the optical axis of the first lens member 13 and a second direction substantially perpendicular to the optical axis of the first lens member 13. In another embodiment, the first actuator member 14 can be a three dimensional actuator and is able to drive the first lens member 13 to move along a third direction substantially perpendicular to the first and second directions. In the illustrated embodiment, the first actuator member 14 is a piezoelectric motor.

The first control chip 15 is configured for controlling the first driver chip 12, the first actuator member 14, and the first wireless transmitting and receiving unit 16.

The first wireless transmitting and receiving unit 16 wirelessly receives signals, sends the received signals to the first control chip 15, and wirelessly transmits signals to another device (the receiving device 20).

The receiving device 20 includes a number of optical signal receivers 21 corresponding to the optical signal emitters 11, a second driver chip 22, a second lens member 23 corresponding to the first lens member 13, a second actuator member 24, a second control chip 25, and a second wireless transmitting and receiving unit 26. The second driver chip 22 is electrically connected to the optical signal receivers 21, the second actuator member 24 is connected to the second lens member 23, the second control chip 25 is electrically connected to the second actuator 24 and the second driver chip 22, and the second wireless transmitting and receiving unit 26 is electrically connected to the second control chip 25.

The optical signal receivers 21 receive light carrying optical signals and convert the optical signal into corresponding electrical signals. The optical signal receivers 21 are arranged along a direction substantially perpendicular to an optical axis of the second lens member 23, and a light incident direction of each optical signal receiving 21 is substantially parallel to the optical axis of the second lens member 23. The optical signal receivers 21 are photodiodes.

The second driver chip 22 drives the optical signal receivers 21 to receive light carrying optical signals.

The second lens member 23 converges incident light and directs the light to the optical signal receivers 21. The optical axis of the second lens member 23 is substantially parallel to the optical axis of the first lens member 13. In this embodiment, the second lens member 23 is the same as the first lens member 13.

The second actuator member 24 drives the second lens member 23 and thereby adjusts a position of the second lens member 23. In the illustrated embodiment, the second actuator member 24 is the same as the first actuator member 14.

The second control chip 25 is configured for processing optical signals received by the optical signal receivers 21 and signals receiver by the second wireless transmitting and receiving unit 26, and controlling the second actuator member 24 and the second transmitting and receiving unit 26 according to a processing result.

The second wireless transmitting and receiving unit 26 wirelessly receives signals, sends the received signals to the second control chip 25, and wirelessly transmits signals to another device (the receiving device 20).

The first and second transmitting and receiving units 16, 26 can be wirelessly transmitting signals between each other. In this embodiment, the first and second transmitting and receiving units 16, 26 are BLUETOOTH wireless communication devices, alternatively, the first and second transmitting and receiving units 16, 26 can be other types wireless communication devices.

In use, the first control chip 15 controls the first driver chip 14 to drive the first optical signal emitters 11 to emit light carrying optical signals in a predetermined frequency and intensity, at the same time, the first control chip 15 sends intensity information of the light to the first wireless transmitting and receiving unit 16, and the first wireless transmitting and receiving unit 16 transmits the intensity information to receiving device 20. The second wireless transmitting and receiving unit 26 receives the intensity information transmitted from the first transmitting and receiving unit 16 and sends the received intensity information to the second control chip 25. The light emitted by the first optical signal emitters 11 is incident to the first lens member 13 and is converged by the first lens member 13, then the light passes through the first lens member 13 and is incident to the second lens member 13. The second lens member 23 converges the light and guides the light to the corresponding optical signal receivers 21. The optical signal receivers 21 receive the light carrying optical signals and convert the optical signals into corresponding electrical signals and send the electrical signals to the second control chip 25. The second control chip 25 calculates an intensity of the light received by the optical signal receivers 21, compares the calculated intensity of light to the intensity information transmitted from the emitting device 10, calculates a transmitting efficiency of the optical communication apparatus 100 according to the comparing result between the calculated intensity and the intensity information, and determines whether the transmitting efficiency is satisfied. If the transmitting efficiency is not satisfied, the second control chip 25 controls the second actuator member 24 to adjust a position of the second lens member 23 until the transmitting efficiency is satisfied.

If the transmitting efficiency is still not satisfied after the adjustment of the second lens member 23, the second control chip 25 sends a signal to the second wireless transmitting and receiving unit 26, and the second wireless transmitting and receiving unit 26 transmits the signal to the first wireless transmitting and receiving unit 16. The first wireless transmitting and receiving unit 16 receives the signal and sends the signal to the first control chip 15. The first control chip 15 controls the first actuator member 24 to adjust a position of the first lens member 13 until the transmitting efficiency is satisfied.

In this embodiment, because the optical signal emitters 11 are arranged in a same manner as the optical signal receivers 21, the light emitting direction of each of the optical signal emitter 11 is substantially parallel to the optical axis of the first lens member 13, the first and second lens members 13, 23 are the same, and the optical axis of the second lens member 13 is substantially parallel to that of the second lens member 23, therefore, the transmitting efficiency of the optical communication 100 is optimized when the optical axes of the first and second lens members 13, 23 are coaxial with each other and a distance between the first and second lens members 13, 23 is substantially double of a focal length of the first lens member 13 (or the second lens member 23). It is understood that, according to different arrangements of the optical signal emitters 11 and the optical signal receivers 21 and different structures of the first and second lens members 13, 23, the first and second lens members 13, 23 may have different relative positions at which the transmitting efficiency is optimized.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical communication apparatus, comprising:
    an emitting device for emitting optical signals, the emitting device comprising a plurality of optical signal emitters for emitting light carrying the optical signals, a first driver chip electrically connected to the optical signal emitters, a first lens member positioned on a path of the light emitted by the optical signal emitters, a first control chip electrically connected to the first driver chip, and a first wireless transmitting and receiving unit electrically connected to the first control chip; and
    a receiving device for receiving the optical signals, the receiving device comprising a plurality of optical signal receivers corresponding the optical signal emitters for respectively receiving the light emitted by the optical signal emitters, a second driver chip electrically connected to the optical signal receivers, a second lens member corresponding to the first lens member, a second control chip electrically connected to the second driver chip, and a second wireless transmitting and receiving unit electrically connected to the second control chip, the first lens member and the second lens member being configured for optically coupling optical signal between the emitting device and the receiving device;
    wherein the first control chip controls the first driver chip to drive the optical signal emitters to emit the light with predetermined intensity, generates an intensity information of the light, and sends the intensity information to the first wireless transmitting and receiving unit, the first wireless transmitting and receiving unit wirelessly transmits the intensity information to the receiving device, the second wireless transmitting and receiving unit receives the intensity information transmitted from the first wireless transmitting and receiving unit and sends the intensity information to the second control chip, the second control chip controls the second driver chip to drive the optical signals receivers to receive the light emitted by the optical signal emitters, calculates an intensity of the received light, compares the calculated intensity to the intensity information transmitted from the first wireless transmitting and receiving unit, and determines whether a transmitting efficiency of the optical communication apparatus is satisfied.

2. The optical communication apparatus of claim 1, wherein the emitting device comprises a first actuator member connected to the first lens member and the first control chip, the emitting device comprises a second actuator member connected to the second lens member and the second control chip, if the transmitting efficiency is not satisfied, the second control chip controls the second lens member to adjust a position of the second lens member until the transmitting efficiency is satisfied.

3. The optical communication apparatus of claim 2, wherein if the transmitting efficiency is still not satisfied after an adjustment of the second lens member, the second control chip sends a signal to the second wireless transmitting and receiving unit, the second wireless transmitting and receiving unit wirelessly transmits the signal to the emitting device, the first wireless transmitting and receiving unit receives the signal transmitted from the second wireless transmitting and receiving unit and sends the signal to the first control chip, the first control chip controls the first actuator member to adjust a position of the first lens member until the transmitting efficiency is satisfied.

4. The optical communication apparatus of claim 1, wherein the first lens member and the second lens member are telecentric lenses.

5. The optical communication apparatus of claim 1, wherein an optical axis of the first lens member is substantially parallel to an optical axis of the second lens member.

6. The optical communication apparatus of claim 5, wherein a light emitting direction of each of the optical signal emitters is substantially parallel to the optical axis of the first lens member.

7. The optical communication apparatus of claim 5, wherein the optical signal emitters are arranged along a direction substantially perpendicular to the optical axis of the first lens member, and the optical signal receivers are arranged along a direction substantially perpendicular to the optical axis of the second lens member.

8. The optical communication apparatus of claim 1, wherein the optical signal emitters are laser diodes, and the optical signal receivers are photodiodes.

9. The optical communication apparatus of claim 2, wherein the first actuator member and the second actuator member are piezoelectric motors.

10. The optical communication apparatus of claim 1, wherein the first wireless transmitting and receiving unit and the second wireless transmitting and receiving unit are radio frequency wireless communication devices.

\* \* \* \* \*